G. R. SMITH.
INTERNAL COMBUSTION ENGINE APPLIANCE.
APPLICATION FILED MAR. 25, 1916.
1,218,126.
Patented Mar. 6, 1917.
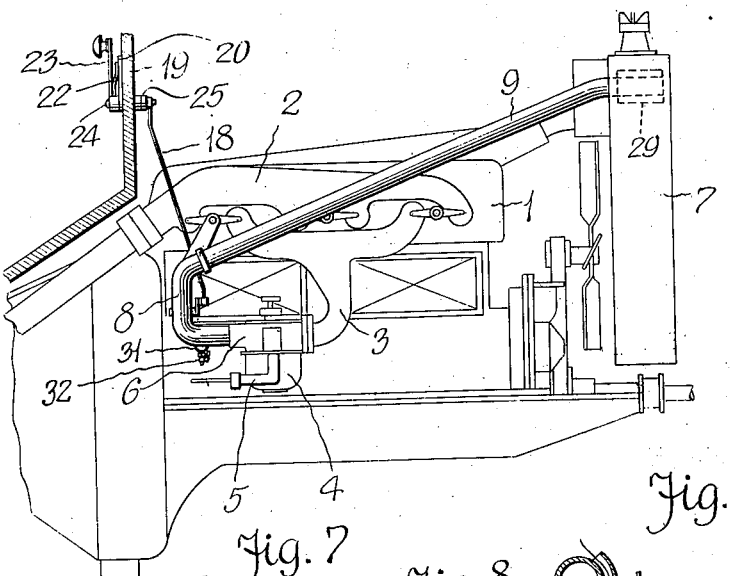
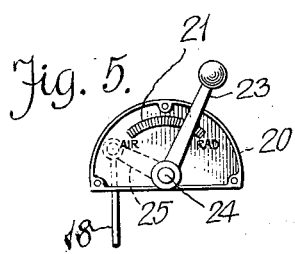
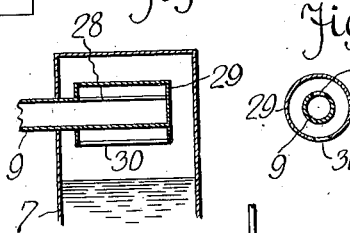
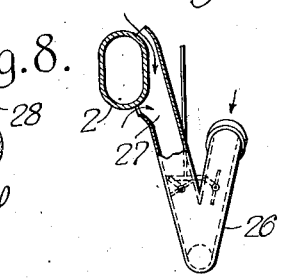
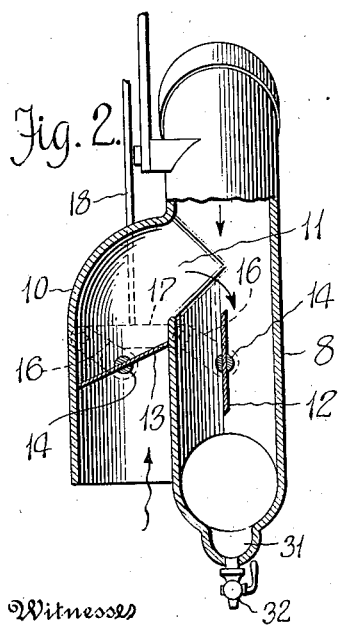
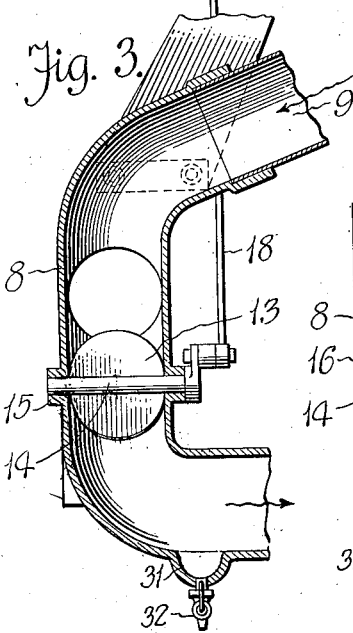
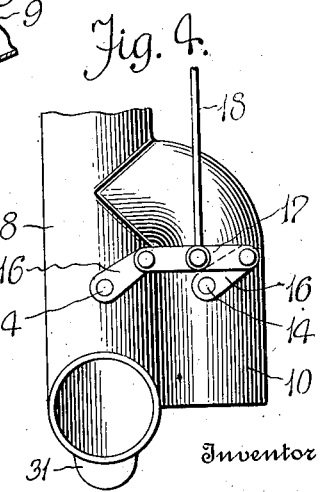
Inventor
George R. Smith,

UNITED STATES PATENT OFFICE.

GEORGE R. SMITH, OF HIGHLAND PARK, MICHIGAN.

INTERNAL-COMBUSTION-ENGINE APPLIANCE.

1,218,126.  Specification of Letters Patent.  Patented Mar. 6, 1917.

Application filed March 25, 1916. Serial No. 86,658.

*To all whom it may concern:*

Be it known that I, GEORGE R. SMITH, a citizen of the United States of America, residing at Highland Park, in the county of Wayne and State of Michigan, have invented certain new and useful Improvements in Internal-Combustion-Engine Appliances, of which the following is a specification, reference being had therein to the accompanying drawings.

This invention relates to an internal combustion engine appliance, and my invention aims to provide means for increasing the power of an engine; for preventing or removing the carbon within an engine; for maintaining a partial vacuum in the top of a radiator which tends to lower the boiling point of the water or cooling agent, and for producing a thorough admixture of air and gasolene and consequently produce a better combustion.

My invention further aims to effect a saving of gasolene and oil by an appliance that may be readily installed in connection with the internal combustion engine of an automobile, and the appliance includes means for easily regulating and properly balancing the admixture of moist air or steam and gasolene.

My invention still further aims to accomplish the above and other results by a simple, durable and inexpensive mechanical construction which will be hereinafter specifically described and then claimed.

Reference will now be had to the drawing, wherein—

Figure 1 is a side elevation of the engine appliance;

Fig. 2 is an end view of a portion of the same partly broken away and partly in section;

Fig. 3 is a vertical sectional view of a portion of the appliance;

Fig. 4 is a side elevation of the same;

Fig. 5 is a front elevation of a dash attachment for an automobile;

Fig. 6 is a side elevation of a carbureter attachment, illustrating a slight modification of my invention;

Fig. 7 is a vertical sectional view of a portion of a radiator, showing an antisplash device or deflector, and Fig. 8 is a cross sectional view of the deflector.

In the drawings, 1 denotes a conventional form of internal combustion engine having an exhaust manifold 2, and an intake manifold 3 provided with a conventional form of carbureter 4, which has a gasolene intake connection 5 and air intake connection 6. Associated with the engine 1 is a radiator 7 containing water or a suitable cooling agent adapted to be circulated in the water jacket of the engine 1, and the elements thus far described are common as the power plant of an automobile or similar vehicle.

Suitably connected to the air intake connection 6 of the carbureter 4 is a vertically disposed elbow 8 and the upper end of said elbow is connected to the upper portion of the radiator 7 by a pipe 9 or a suitable conduit. This side of the elbow 8 has an integral extension or by-path 10 establishing communication between the elbow 8 and the atmosphere.

In the elbow 8, between the carbureter 4 and the air port 11 is a butterfly valve or throttle 12 and in the by-path 10 is a butterfly valve or throttle 13. These valves or throttles are carried by shafts 14 journaled in suitable bearings 15 forming part of the walls of the elbow 8 and the by-path 10. Ends of the shafts 14 are provided with cranks 16 pivotally connected by a link 17, and connected to said link is a reach rod 18 extending upwardly in proximity to the dash 19 of an automobile provided with my appliance. On the dash 19 is a suitable face plate 20 provided with a segment rack 21 normally engaged by a latch member 22 carried by a crank 23. The crank 23 is on one end of a shaft 24 journaled in the base plate 20 and the dash 19, and on the opposite end of said shaft is a crank 25 to which the upper end of the reach rod 18 is connected. The face plate 20 contains indicia such as "Air" and "Rad." (an abbreviation for radiator) and it is through the medium of the crank 23, shaft 24, crank 25, reach rod 18, link 17 and cranks 16 that the shafts 14 may be rocked in synchronism and thereby simultaneously move the valves 12 and 13. These valves are positioned relative to the shafts 14 whereby one valve will be open while the other is closed, as best shown in Fig. 2.

With the upper portion of the radiator 7 in communication with the air intake connection 6 of the carbureter 4, steam or moist air in the upper portion of the radiator 7 will be drawn into the carbureter 4, and the admission of steam, as well as air to the carbureter can be easily regulated by the valves 12 and 13 and the operating mechanism thereof. The proportions of air and steam in an explosive mixture can be regulated to a nicety, to insure a proper combustion of the fuel within the cylinders of the engine and a high degree of efficiency.

In Fig. 6 of the drawing, there is illustrated a slight modification of my invention, wherein the carbureter attachment or appliance is in the form of a V connection 26 and the intake portion 27 of said connection extends to the exhaust manifold 2, whereby air entering the V connection will be heated from the walls of the exhaust manifold. The branches or portions of the V connection 26 contains butterfly valves or throttles, similar to the elbow previously described.

During the operation of an automobile equipped with my appliance, there may be splashing of the water or cooling agent within the radiator 7 and to prevent water from entering the end of the conduit 9, the inner end of the conduit has the top thereof provided with a longitudinal slot 28 and the slotted end of the conduit is surrounded by a deflector or drum 29 having the bottom side thereof provided with a slot or opening 30. This deflector or drum prevents water from entering the upper end of the conduit 9, but should some water enter the same or there be a condensate on the inner walls of the conduit 9, the bottom side of the elbow 8 has a drain recess or pocket 31 provided with a drain cock 32. In view of this drain pocket or recess and the deflector used on the upper end of the conduit 9, it is practically impossible for water to enter the carbureter and interfere with the operation of the same or the proper admixture of air and gas therein.

It is thought that the operation and utility of the appliance will be apparent without further description, and while in the drawing there is illustrated a preferred embodiment of my invention, it is to be understood that the structural elements are susceptible to such variations and modifications as fall within the scope of the appended claims.

What I claim is:—

1. The combination with an internal combustion engine, having a carbureter and a radiator, of a conduit connecting the upper portion of said radiator to said carbureter, a by-path extension forming part of said conduit and constituting an air inlet thereto, valves in said by-path extension and said conduit, and means adapted for moving said valves in synchronism.

2. The combination with an internal combustion engine, having a carbureter and a radiator, of an elbow in communication with said carbureter, a conduit connecting said elbow to the upper portion of said radiator, a by-path extension carried by said elbow and constituting an air inlet therefor, valves in said by-path extension and said elbow, and means including rock shafts adapted for moving said valves in synchronism.

3. The combination with an internal combustion engine having a carbureter and a radiator, of a conduit connected to the upper portion of said radiator, a connection between said conduit and said carbureter, said connection having an air intake in proximity to the manifold of said engine, valves in said connection, and means adapted for moving said valves in synchronism.

In testimony whereof I affix my signature in presence of two witnesses.

GEORGE R. SMITH.

Witnesses:
KARL H. BUTLER,
ANNA M. DORR.